United States Patent Office 3,766,252
Patented Oct. 16, 1973

3,766,252
UNSATURATED CARBOXYLIC ACID DERIVATIVES CONTAINING PHOSPHORUS
Erwin Schmidt, Kelkheim, Taunus, and Claus Beermann, Neu-Isenburg, Germany, assignors to Farbwerke Hoechst Aktiengesellschaft vormals Meister Lucius & Bruning, Frankfurt am Main, Germany
No Drawing. Filed Oct. 26, 1971, Ser. No. 192,560
Claims priority, application Germany, Oct. 27, 1970, P 20 52 569.3
Int. Cl. C07c 69/54
U.S. Cl. 260—486 R  8 Claims

ABSTRACT OF THE DISCLOSURE

Phosphonylalkyl (meth)-acrylates are useful monomers for the preparation of flame-proof copolymers having an improved affinity for dyestuffs. The new compounds are obtained by acylation of phosphonylalkyl alcohols or amines with acylating (meth-)acrylic acid derivatives.

---

The present invention relates to carboxylic acid derivatives containing phosphorus of the general formula

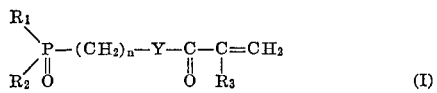

(I)

wherein $R_1$ and $R_2$ are lower alkyl each having up to three carbon atoms, $R_3$ stands for hydrogen or methyl, X represents oxygen or sulfur, Y is oxygen or a group of the formula —NR—, in which R is hydrogen or lower alkyl having up to 3 carbon atoms and $n$ represents one of the intergers 1, 2 or 3.

As lower alkyl corresponding to the above-mentioned definition, ethyl, n- and i-propyl groups are preferred, in particular the methyl group.

The compounds of the General Formula I are prepared by reacting compounds of the general formula

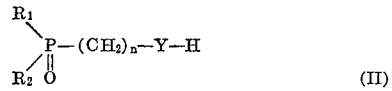

(II)

wherein $R_1$, $R_2$, X, Y and $n$ are as defined above with compounds of the general formula

(III)

wherein Z represents a halogen, preferably a chlorine atom or a group of the formula $R_4O$—, in which $R_4$ stands for lower alkyl, preferably methyl, and wherein $R_3$ has the above-mentioned meaning.

The starting materials of Formula II may be obtained according to known methods. For example, the phosphine-oxido alcohols may be prepared according to the processes described in the following literature references: E. J. Grinstein et al., Z.obšč. Chim. 36, (1966), 302; A. B. Brucker et al., Z. obšč. Chim. 36 (1966), 484; German Offenlegungsschrift No. 2,040,280. It is also possible to obtain phosphine-oxido amines for Formula II not only by the process described in the above-mentioned German Offenlegungsschrift, but also in accordance with the method of preparation of N. Kreutzkamp, Angew. Chem. 77, (1965), 1135. The phosphine-sulfido compounds of the Formula II can be prepared according to the method of K. A. Petrov et al., Z. obšč. Chim. 35, (1065), 2062 or according to the process described in German patent specification No, 1,300,562.

The acylation of the alcohols and amines with acrylic acid or methacrylic acid chloride is preferably carried out in the presence of a hydrogen chloride binding agent, for example a tertiary amine, such as triethylamine or pyridine. The transesterification of the alcohols of Formula II (Y=O) is preferably carried out in the presence of a metal alcoholate in accordance with known methods.

The crude reaction products may be purified in known manner by recrystallization or distillation. If inert solvents are used in the process, they may be used directly for recrystallisation of the reaction product.

Typical carboxylic acid derivatives containing phosphorus in accordance with the invention are for example: the acrylic acid and methacrylic acid esters of dimethyl-hydroxymethyl-phosphine oxide,
dimethyl-hydroxyethyl-phosphine-oxide,
dimethyl-hydroxypropyl-phosphine-oxide,
methyl-ethyl-hydroxy-methyl-phosphine-oxide,
methyl-iso-propyl-hydroxypropyl-phosphine-oxide,
diethyl-hydroxymethyl-phosphine-oxide,
di-iso-propylhydroxymethyl-phosphine oxide,
dimethyl-hydroxymethyl-phosphine-sulfide,
ethyl-n-propyl-hydroxymethyl-phosphine sulfide, besides,
N-(3-dimethyl-phosphineoxide-propyl)-acrylamide,
N-methyl-N-(3-diethyl-phosphineoxido-propyl)-methyl acrylamide,
N-propyl-N-(3-dipropyl-phosphineoxido-propyl)-acrylamide or
N-(3-methyl-ethyl-phosphineoxido-propyl)-acrylamide.

Due to their unsaturated carbon-carbon bond, the new carboxylic acid derivatives are suitable as monomers or comonomers for preparing polymers. Thus, by copolymerization with monomers such as acrylic acid derivatives, styrene or vinyl compounds, flame-proof polymers are obtained having an improved capability of being dyed and improved antistatic properties.

The following examples serve to illustrate the invention.

EXAMPLE 1

108 g. of

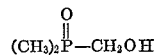

and 110 g. of triethylamine were dissolved in 300 ml. of anhydrous acetone and 95 g. of acrylic acid chloride were dropepd to this solution during one hour at a temperature of from 5 to 10° C. After another 30 minutes, the precipitate (triethylamine hydrochloride) was suction-filtered.

After distilling off the solvent, the filtrate was distilled in vacuo. Yield: 101 g. of

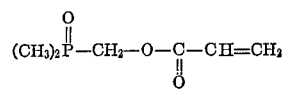

(62% of the theory), the boiling point under a pressure of 0.03 mm. of mercury was in the range of from 112 to 115° C.

In the infrared spectrum the reaction product showed no OH-band at 3μ, but a CO-band at 6.2μ. The content of phosphorus amounted to 19.7% (calcd. 19.11%).

EXAMPLE 2

From an anhydrous mixture of 200 g. of methyl methacrylate, 2 g. of hydroquinone, 68 g. of

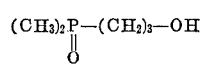

and 1 g. of magnesium methylate, an azeotropically boiling mixture consisting of methanol and methyl methacrylate was slowly distilled off by means of a silver jacket column having a length of 1 meter. When a sump temperature of 120° C. was reached, any further methyl methacrylate is distilled off in vacuo. From the remaining residue 70 g. (68% of the theory) of the phosphine oxide of the formula

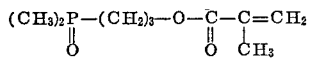

having a boiling point of 139 to 140° C. under a pressure of 0.5 mm. of mercury were obtained by vacuum distillation.

*Analysis.*—Found (percent): C, 52.4; H, 8.3; P, 15.1. Calcd. (percent): C, 52.92; H, 8.39; P, 15.16.

From an anhydrous mixture consisting of 180 g. of methyl acrylate, 2 g. of hydroquinone, 1 g. of magnesium methylate and 68 g. of $(CH_3)_2P(O)$—$(CH_2)_3$—OH, 65 g. of the compound of the formula

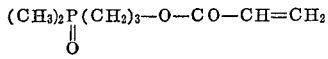

having a boiling point of 155 to 156° C. under a pressure of 0.7 mm. of mercury, were obtained in the same way.

*Analysis.*—Found (percent): C, 50.4; H, 8.3; P, 16.8. Calcd. (percent): C, 50.5; H, 8.0; P, 16.3.

EXAMPLE 3

9.1 g. of acrylic acid chloride were dropped at 5° C. while stirring to a solution of 12.4 g. of

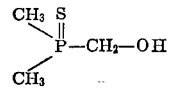

and 12 g. of triethylamine in 75 ml. of anhydrous acetone. The mixture was suction-filtered, the filter residue was washed with acetone and the filtrate was evaporated in vacuo. The product of the formula

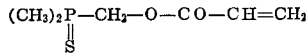

was obtained as an oily residue.

EXAMPLE 4

9.1 g. of acrylic acid chloride was dropped at 5° C. to a mixture of 13.5 g. of the amine of the formula

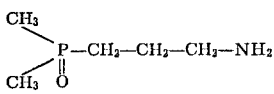

and 12 g. of triethylamine in 75 ml. of anhydrous acetone. The resulting reaction mixture was suction-filtered, the filter residue washed with acetone and the filtrate evaporated in vacuo. The product of the formula

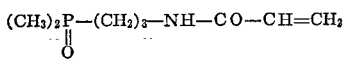

as an oily residue.

A further phosphine oxide according to the invention is:

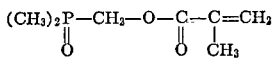

melting point 103° C.

EXAMPLE 5 (HOMOPOLYMER)

A solution of 50 g. of the compound

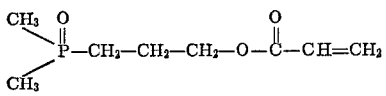

in 250 milliliters of water was de-aerated and covered with nitrogen. After 2 g. of ammonium persulfate and 0.4 g. of sodium bisulfite had been added, the solution was maintained at 30° C. for 24 hours, whereby it became very viscous. It was then concentrated in vacuo and triturated with acetone. The residue which was insoluble in acetone was dried in vacuo at 60° C. It was clearly soluble in water. A solution of 1% strength in water had a relative viscosity of 1.8 at 25° C.

EXAMPLE 6 (COPOLYMER)

5 g. of ammonium monopersulfate and 0.4 g. of sodium bisulfite were added to a soltuion of 150 g. of acrylonitrile and 50 g. of the compound

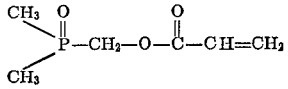

in 1 liter of mixture consisting of equal parts of water and methanol under an atmosphere of pure nitrogen. After having been stirred for 24 hours at 30° C., the polymer obtained was filtered off with suction, was washed with methanol and dried at 60° C. in vacuo. 125 g. of a polymer were obtained, which had a content of phosphorus of 3.4%. The relative viscosity of a 1% solution of the polymer in dimethyl formamide at 25° C. was 3.1.

A 15% solution of this polymer in dimethyl formamide was cast into sheets, which were dried in vacuo, soaked and then dried again. When the sheets were inflammed, they were self-extinguishing.

EXAMPLE 7 (COPOLYMER)

A solution of 60 g. of acrylonitrile, 10 g. of vinylidene chloride and 20 g. of the compound

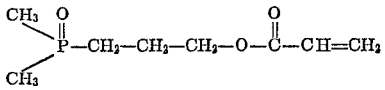

in 500 milliliters of a mixture consisting of equal parts of water and methanol was de-aerated and covered with nitrogen at a temperature of —20° C., and 2 g. of ammonium monopersulfate and 0.4 g. of sodium bisulfite were added. The polymerization was carried out for 24 hours at +30° C. The precipitated polymer was filtered off with suction, was washed with methanol and dried. 75 g. of polymer were obtained containing 8.4% of chlorine and 2.6% of phosphorus. The relative viscosity of a 1% solution of the polymer in dimethyl formamide was 3.6 at 25° C. A 15% solution of the polymer in dimethyl formamide was cast into films on glass plates, was dried in vacuo, soaked and dried once more. The sheets were self-extinguishing.

EXAMPLE 8 (COPOLYMER)

A mixture prepared at —20° C. consistnig of 250 milliliters of water, 80 g. of acrylonitrile, 10 g. of vinyl bromide, 10 g. of the compound

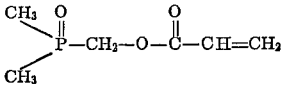

2 g. of ammonium monopersulfate, and 0.4 g. of sodium bisulfite was polymerized in an autoclave for 24 hours at +30° C. The polymer was filtered off with suction and was dried. The yield was 85 g. The relative viscosity of a 1% solution of the polymer in dimethyl formamide was 4.2 at 25° C. Sheets prepared on the basis of this polymer in accordance with Example 4 were self-extinguishing.

EXAMPLE 9 (COPOLYMER)

With the exclusion of oxygen, 80 g. of acrylonitrile, 15 g. of vinylidene chloride, 5 g. of the compound

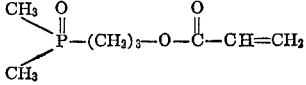

where polymerized in 500 milliliters of a mixture consisting of equal parts of methanol and water at 30° C. by adding 2 g. of ammonium monopersulfate and 0.4 g. of sodium bisulfite. In a 1% solution in dimethyl formamide at 25° C., the polymer had a relative viscosity of 3.9. Sheets manufactured on the basis of these polymers, which were prepared according to Example 4, were hard to inflame.

EXAMPLE 10 (COPOLYMER)

14 drops of concentrated sulfuric acid were added to 780 milliliters of water, and the mixture was de-aerated by the introduction of nitrogen. Subsequently, 60 milliliters of a solution of 0.4768 g. of iron ammonium sulfate and 5 milliliters of concentrated sulfuric acid in 1 liter of water, 0.45 g. of potassium peroxy-disulfate, dissolved in 50 milliliters of water, and 0.15 g. of sodium bisulfite in 50 milliliters of water were added. A mixture of 48 g. of acrylonitrile and 12 g. of the compound

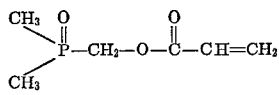

was added to the catalyst solution thus obtained. After two hours the polymer was filtered off with suction and was dried at 60° C. 50 g. of polymer were obtained which had a relative viscosity of 5.0, measured with a 1% solution in dimethyl formamide at 25° C. The polymer contained 2.6% of phosphorus. Sheets manufactured on the basis of this material were self-extinguishing.

EXAMPLE 11 (COPOLYMER)

500 milliliters of a mixture consisting of equal parts of water and methanol were de-aerated and covered with nitrogen in an autoclave provided with stirrer at —20° C. Subsequently, 2 g. of ammonium persulfate and 0.4 g. of sodium bisulfite were added, and, after their dissolution, a mixture was added consisting of 80 g. of acrylonitrile, 10 g. of vinyl bromide, and 10 g. of the compound

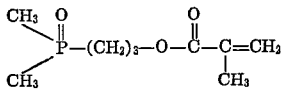

The autoclave was locked and was stirred for 24 hours at +30° C. After filtration by suction and drying, 93 g. of polymer were otbained, which had a relative viscosity of 2.9, measured with 1 g. of substance in 100 milliliters of dimethyl formamide at 25° C. The polymer contained 6.6% of bromine and 1.5% of phosphorus. In the form of a solution in dimethyl formamide, it could be cast into sheets, which were self-extinguishing after having been soaked and dried.

EXAMPLE 12 (COPOLYMER)

A monomer mixture consisting of 78% by weight of acrylonitrile, 12% of vinylidene chloride, and 10% of the compound

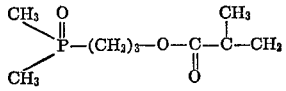

was pumped into a polymerization flask having a capacity of 1 liter in an amount of 100 milliliters per hour. At the same time 100 milliliters per hour of a solution consisting of 80 milliliters of water and 20 milliliters of methanol were added in dosed quantities, in which solution 0.62 g. of $CH_3COONa \cdot 3H_2O$, about 2 mg. of iron ammonium sulfate, and about 5 g. of $ZnSO_4 \cdot 7H_2O$ were dissolved, and which was adjusted to a pH value of about 2.1 by means of sulfuric acid.

Also at the same time the following solutions were added in an amount of 100 milliliters per hour each:

(a) a solution of 0.33 g. of $K_2S_2O_8$ in 90 milliliters of water and 10 milliliters of methanol,
(b) a solution of 1.33 g. of $Na_2S_2O_5$ in 90 milliliters of water and 10 milliliters of methanol.

The polymerization was carried out at 30° C. with the exclusion of oxygen. After an average polymerization time of 90 minutes, the polymer suspension which had been formed was continuously separated, in which process a reaction rate of about 70% can be obtained. The purified and dried polymer showed a relative viscosity of 1.9, measured as a 0.5% solution in dimethyl formamide at 20° C. The polymer contained 8.5% of chlorine and 1.5% of phosphorus.

The polymer obtained was dissolved in dimethyl formamide to give a 23% by weight solution which was spun into a bath consisting of 65% of dimethyl formamide and 35% of water. The filaments were drawn, dried and set in known manner. Textile fabrics made of these filaments were marked by a good capability of being dyed, and they were self-extinguishing.

Filaments on the basis of this copolymer having corresponding properties could also be obtained, if a dry spinning process was applied.

We claim:

1. A compound of the formula $$\begin{array}{c} R_1 \\ \diagdown \\ R_2 \end{array} \!\! \begin{array}{c} X \\ \| \\ P \end{array} \!\! -(CH_2)_n-Y-\underset{\underset{O}{\|}}{\overset{R_3}{\underset{|}{C}}}-C=CH_2$$

in which $R_1$ and $R_2$ are lower alkyl, $R_3$ is hydrogen or methyl, X is oxygen or sulfur, Y is oxygen, and $n$ is 1, 2 or 3.

2. A compound as claimed in claim 1, in which $R_1$ and $R_2$ are methyl, $R_3$ is hydrogen or methyl, X is oxygen or sulfur, Y is oxygen and $n$ is 1, 2 or 3.

3. A compound as claimed in claim 1, in which $R_1$ and $R_2$ are methyl, $R_3$ is hydrogen or methyl, X is oxygen or sulfur, Y is oxygen and $n$ is 1 or 3.

4. A compound as claimed in claim 1, in which X is oxygen.

5. The compound as claimed in claim 1, in which $R_1$ and $R_2$ are methyl, $R_3$ is hydrogen, X and Y are oxygen and $n$ is 1.

6. The compound as claimed in claim 1, in which $R_1$ and $R_2$ are methyl, $R_3$ is hydrogen, X and Y are oxygen and $n$ is 3.

7. The compound as claimed in claim 1, in which $R_1$, $R_2$ and $R_3$ are methyl, X and Y are oxygen and $n$ is 3.

8. The compound as claimed in claim 1, in which $R_1$ and $R_2$ are methyl, $R_3$ is hydrogen, X is sulfur, Y is oxygen and $n$ is 1.

References Cited

UNITED STATES PATENTS 3,347,818  10/1967  Howe _____ 260—486 R

FOREIGN PATENTS 813,539  9/1955  Great Britain _____ 260—486 R

LORRAINE A. WEINBERGER, Primary Examiner

P. J. KILLOS, Assistant Examiner

U.S. Cl. X.R.

252—8.1; 260—80.81, 85.5 ES, 561 P